US012638741B2

(12) United States Patent
Lu et al.

(10) Patent No.: US 12,638,741 B2
(45) Date of Patent: May 26, 2026

(54) THIN-FILM TRANSISTOR DISPLAY PANEL AND MANUFACTURING METHOD THEREOF

(71) Applicant: HKC CORPORATION LIMITED, Shenzhen (CN)

(72) Inventors: Jinsong Lu, Shenzhen (CN); Song Sun, Shenzhen (CN); Qin Xiong, Shenzhen (CN); Kaijun Liu, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 588 days.

(21) Appl. No.: 18/145,641

(22) Filed: Dec. 22, 2022

(65) Prior Publication Data

US 2024/0069403 A1 Feb. 29, 2024

(30) Foreign Application Priority Data

Aug. 26, 2022 (CN) .......................... 202211032881.6

(51) Int. Cl.
| | |
|---|---|
| *G02F 1/167* | (2019.01) |
| *G02F 1/16755* | (2019.01) |
| *G02F 1/1679* | (2019.01) |

(52) U.S. Cl.
CPC .......... *G02F 1/167* (2013.01); *G02F 1/16755* (2019.01); *G02F 1/1679* (2019.01)

(58) Field of Classification Search
CPC .............................. G02F 1/1681; G02F 1/167
See application file for complete search history.

(56) References Cited

U.S. PATENT DOCUMENTS

| | | |
|---|---|---|
| 2011/0075249 A1 | 3/2011 | Murakami |
| 2013/0308175 A1 | 11/2013 | Yasui et al. |

FOREIGN PATENT DOCUMENTS

| | | |
|---|---|---|
| CN | 103424949 A | 12/2013 |
| JP | 2004294716 A | 10/2004 |

(Continued)

OTHER PUBLICATIONS

CNIPA, Office Action for CN Application No. 202211032881.6, Sep. 15, 2023.

(Continued)

*Primary Examiner* — Lauren Nguyen
(74) *Attorney, Agent, or Firm* — Hodgson Russ LLP

(57) ABSTRACT

The display panel includes: a first substrate and a second substrate disposed opposite to the first substrate, wherein an electrophoresis layer and electrophoresis ions are disposed on the first substrate, the electrophoresis layer is located between the second substrate and the first substrate, the electrophoresis layer is provided with a plurality of electrophoresis tanks arranged in an array, openings of the electrophoresis tanks face the second substrate, and the electrophoresis ions are located in the electrophoresis tanks; and one of the electrophoresis layer and the second substrate is provided with a positioning groove, the other is provided with a positioning block embedded into the positioning groove, and orthographic projections of the positioning groove and the positioning block on the first substrate are at least partially located between orthographic projections of two adjacent electrophoresis tanks on the first substrate. The pressure resistance of the display panel is improved.

7 Claims, 11 Drawing Sheets

(56)        References Cited

FOREIGN PATENT DOCUMENTS

| JP | 2007-17735 | * | 1/2007 | ............ | G02F 1/167 |
|----|------------|---|--------|-------------|------------|
| JP | 2007017735 A | | 1/2007 | | |
| JP | 2007272135 A | | 10/2007 | | |
| JP | 2012063419 A | | 3/2012 | | |
| JP | 2013007985 A | | 1/2013 | | |
| JP | 2015-18062 | * | 1/2015 | ............ | G02F 1/167 |
| JP | 2015018062 A | | 1/2015 | | |
| KR | 20050114123 A | | 12/2005 | | |

OTHER PUBLICATIONS

CNIPA, Office Action for CN Application No. 202211032881.6, May 31, 2023, see X/Y/A designations.
CNIPA, Office Action for CN Application No. 202211032881.6, May 31, 2023 (X/Y/A designations).

* cited by examiner

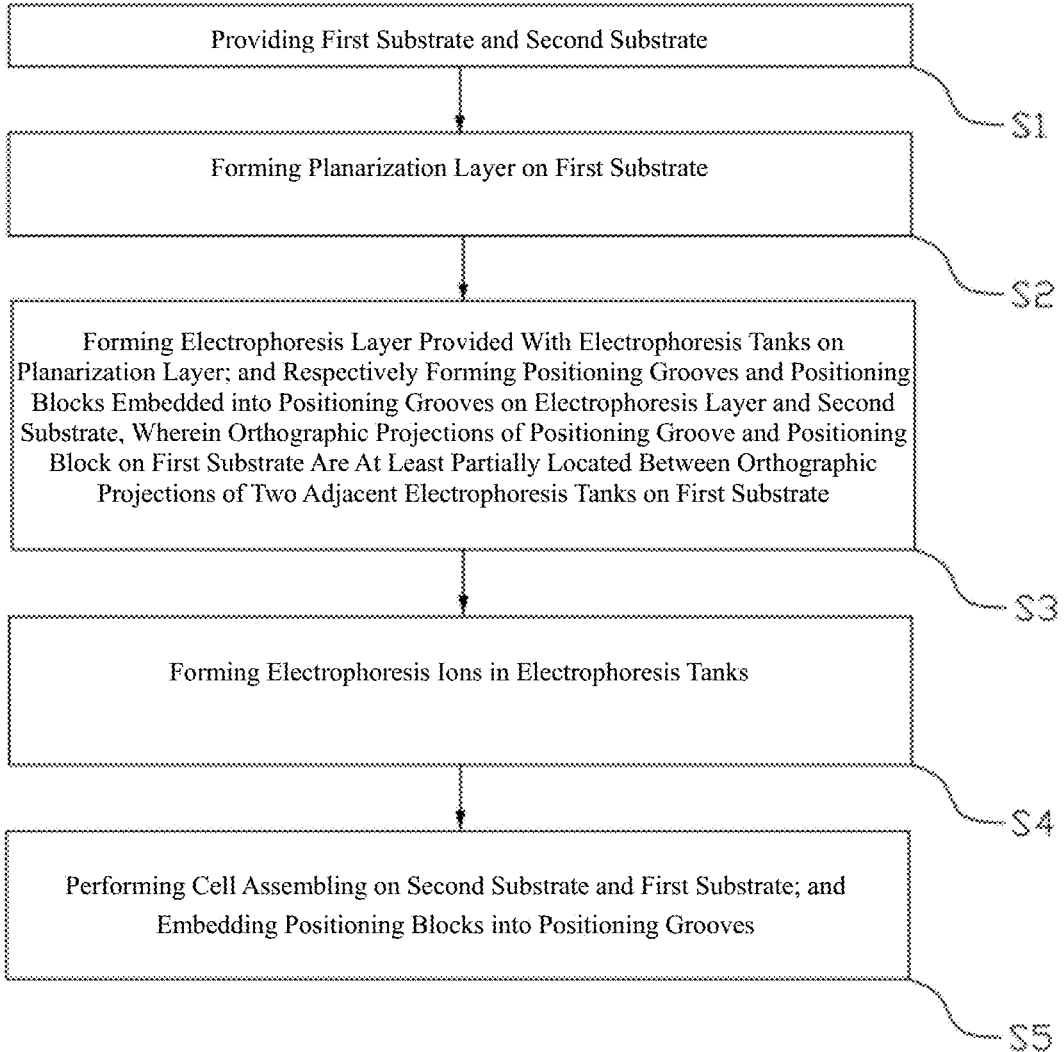

| Providing First Substrate and Second Substrate |
| --- |

— S1

| Forming Planarization Layer on First Substrate |
| --- |

— S2

| Forming Electrophoresis Layer Provided With Electrophoresis Tanks on Planarization Layer; and Respectively Forming Positioning Grooves and Positioning Blocks Embedded into Positioning Grooves on Electrophoresis Layer and Second Substrate, Wherein Orthographic Projections of Positioning Groove and Positioning Block on First Substrate Are At Least Partially Located Between Orthographic Projections of Two Adjacent Electrophoresis Tanks on First Substrate |
| --- |

— S3

| Forming Electrophoresis Ions in Electrophoresis Tanks |
| --- |

— S4

| Performing Cell Assembling on Second Substrate and First Substrate; and Embedding Positioning Blocks into Positioning Grooves |
| --- |

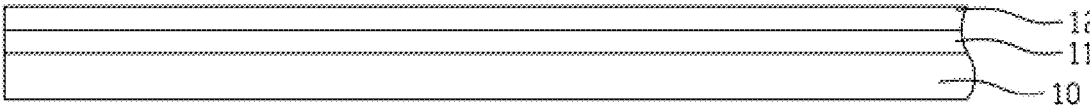

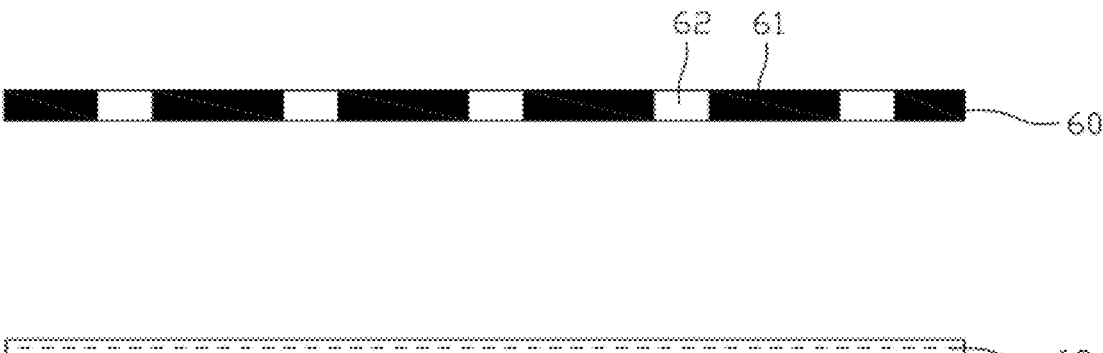
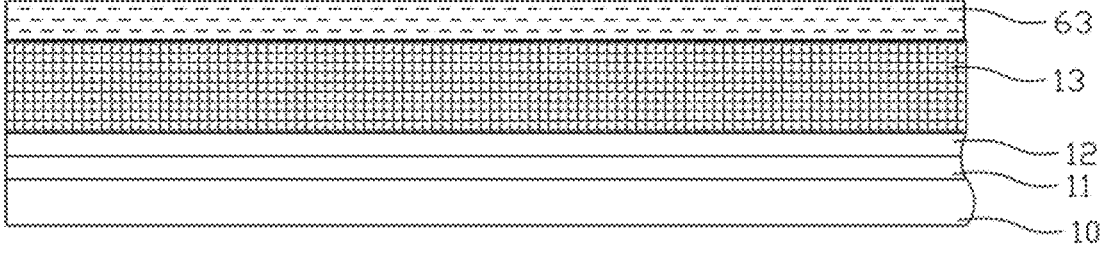
FIG. 15
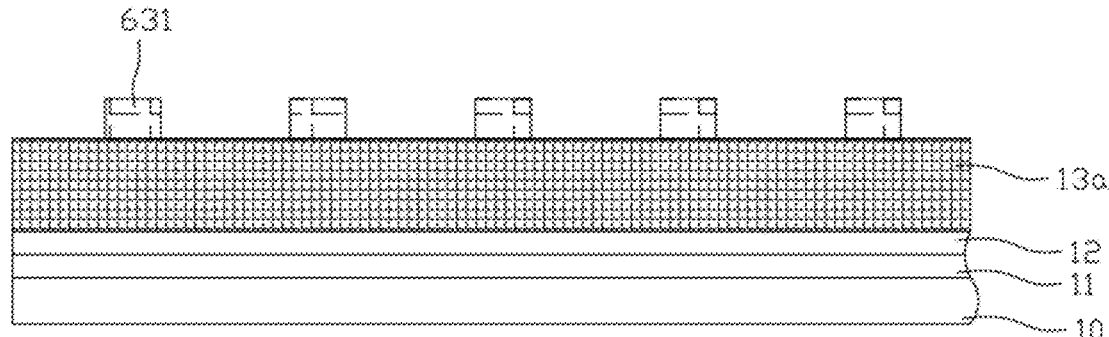
FIG. 16

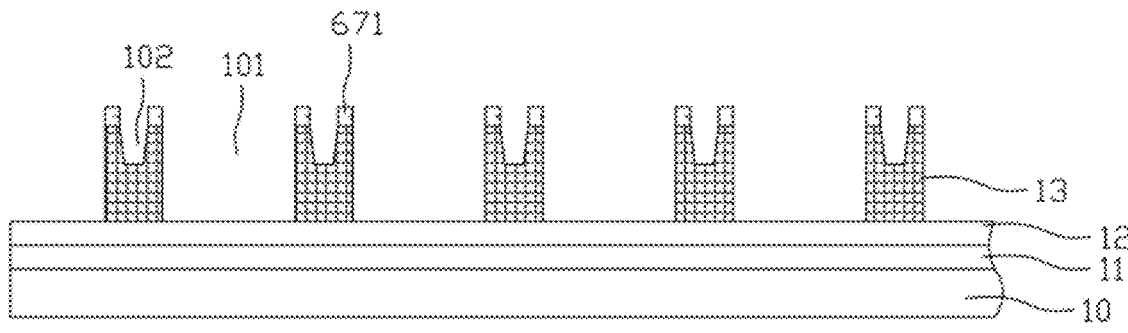
FIG. 20
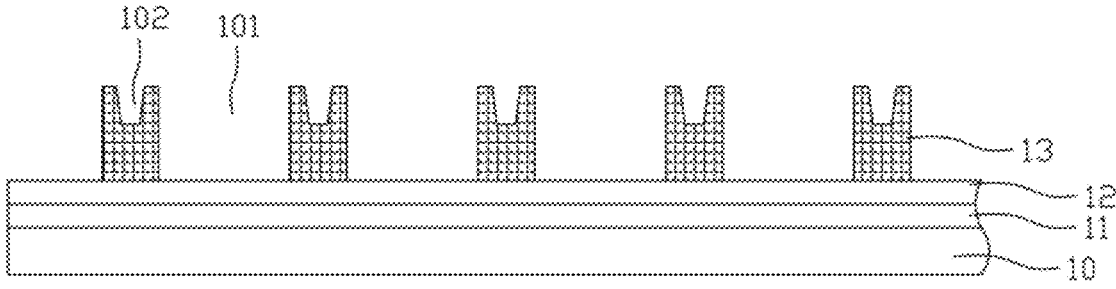
FIG. 21
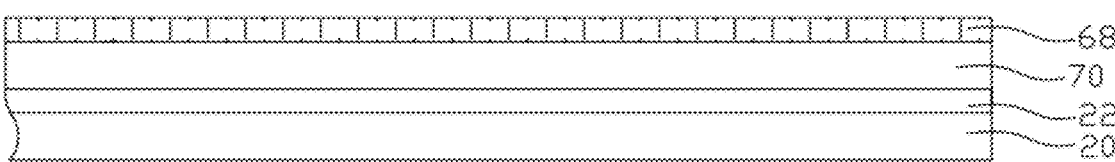
FIG. 22

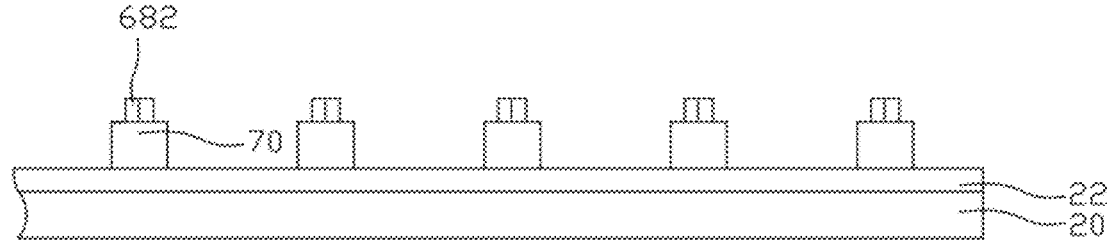
FIG. 26
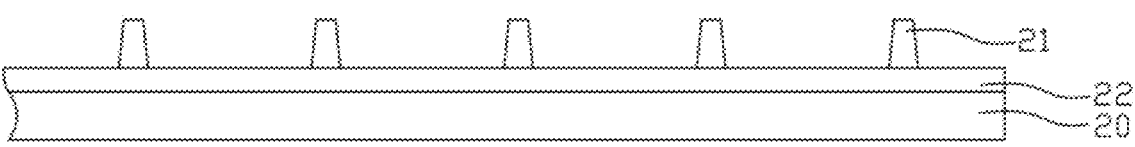
FIG. 27
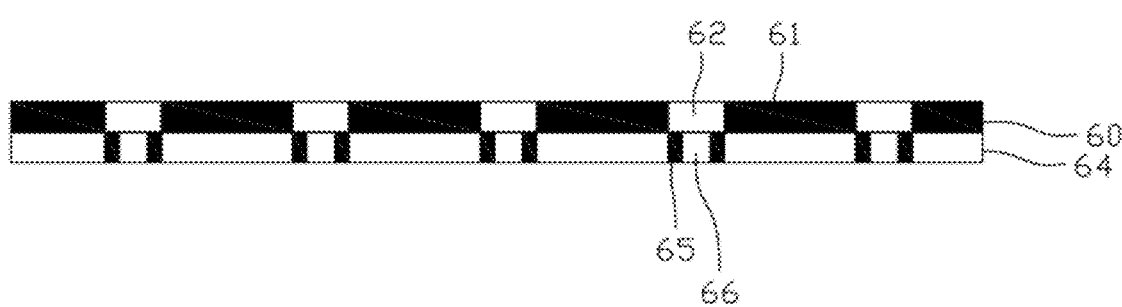
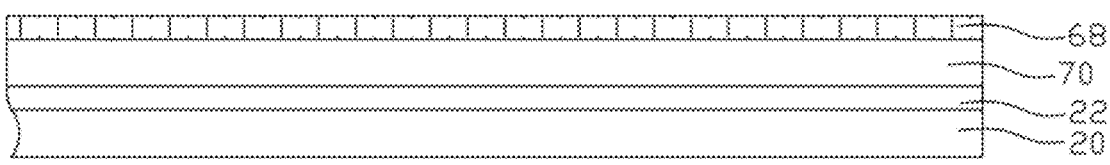
FIG. 28

THIN-FILM TRANSISTOR DISPLAY PANEL AND MANUFACTURING METHOD THEREOF

CROSS-REFERENCE TO RELATED APPLICATION

This application claims priority to Chinese Patent Application No. 202211032881.6, filed Aug. 26, 2022, the entire disclosure of which is incorporated herein by reference.

FIELD OF TECHNOLOGY

The present invention belongs to the field of display panel device technologies, and in particular, to a display panel and a manufacturing method thereof.

BACKGROUND

Electro-phoretic display (EPD) technologies move charged pigment balls by applying an electric field in a liquid environment, to display an effect with different colors, which belong to paper-like reflective displays, that is, electrophoretic-paper (E-Paper) displays.

Specifically, all the E-Paper displays include array substrates provided with thin-film transistors and cell assembled substrates that are cell assemble with the array substrates. The array substrate includes an electrophoresis layer, electrophoresis tanks provided on the electrophoresis layer, and electrophoresis ions located in the electrophoresis tanks. After cell assembling is performed on the array substrate and the cell assembled substrate, there is a small gap between the electrophoresis layer and the cell assembled substrate. Because the electrophoretic ions are diffusive, the electrophoretic ions are easy to diffuse outward from the openings of the electrophoresis tanks through the gap between the electrophoresis layer and the cell assembled substrate.

SUMMARY

There are provided a display panel and a manufacturing method thereof, according to embodiments of the present disclosure. The technical solution is as below.

According to a first aspect of the present disclosure, there is provided a display panel including: a first substrate and a second substrate disposed opposite to the first substrate, wherein an electrophoresis layer and electrophoresis ions are disposed on the first substrate, the electrophoresis layer is located between the second substrate and the first substrate, the electrophoresis layer is provided with a plurality of electrophoresis tanks arranged in an array, openings of the electrophoresis tanks face the second substrate, and the electrophoresis ions are located in the electrophoresis tanks, wherein one of the electrophoresis layer and the second substrate is provided with a positioning groove, the other of the electrophoresis layer and the second substrate is provided with a positioning block embedded into the positioning groove, and orthographic projections of the positioning groove and the positioning block on the first substrate are at least partially located between orthographic projections of two adjacent electrophoresis tanks on the first substrate.

According to a second aspect of the present disclosure, there is provided a manufacturing method of a display panel, including:

forming an electrophoresis layer on a first substrate;

forming a plurality of electrophoresis tanks arranged in an array on the electrophoresis layer, and respectively forming positioning grooves and positioning blocks embedded into the positioning grooves on the electrophoresis layer and a second substrate, wherein opening directions of the positioning grooves are the same as opening directions of the electrophoresis tanks, and orthographic projections of the positioning groove and the positioning block on the first substrate are at least partially located between orthographic projections of two adjacent electrophoresis tanks on the first substrate;

forming electrophoresis ions in the electrophoresis tanks; and performing cell assembling on the second substrate and the first substrate, and simultaneously embedding the positioning blocks into the positioning grooves.

It should be understood that the above general description and the following detailed description are only exemplary and explanatory, and should not be construed as a limitation to the present invention.

BRIEF DESCRIPTION OF THE DRAWINGS

The accompanying drawings incorporated into the specification and constituting a part of the specification illustrate the embodiments of the present invention, and are used together with the description to explain the principles of the present invention. Apparently, the accompanying drawings in the following description show merely some embodiments of the present invention, and those of ordinary skill in the art may still derive other drawings from these accompanying drawings without creative efforts.

FIG. 1 is a block diagram of a manufacturing process of S1 to S4 in a manufacturing method of a display panel according to Embodiment 1 of the present invention.

FIG. 2 is a schematic structural diagram of a part of a manufacturing process of S1 and S2 in a manufacturing method of a display panel according to Embodiment 1 of the present invention.

FIG. 15 to FIG. 21 sequentially show schematic structural diagrams of a part of a manufacturing process of S'3 of forming an electrophoresis layer in a manufacturing method of a display panel according to Embodiment 2 of the present invention.

FIG. 22 to FIG. 30 sequentially show schematic structural diagrams of a part of a manufacturing process of S'3 of forming positioning blocks in a manufacturing method of a display panel according to Embodiment 2 of the present invention.

DETAILED DESCRIPTION OF THE EMBODIMENTS

Figure 3:
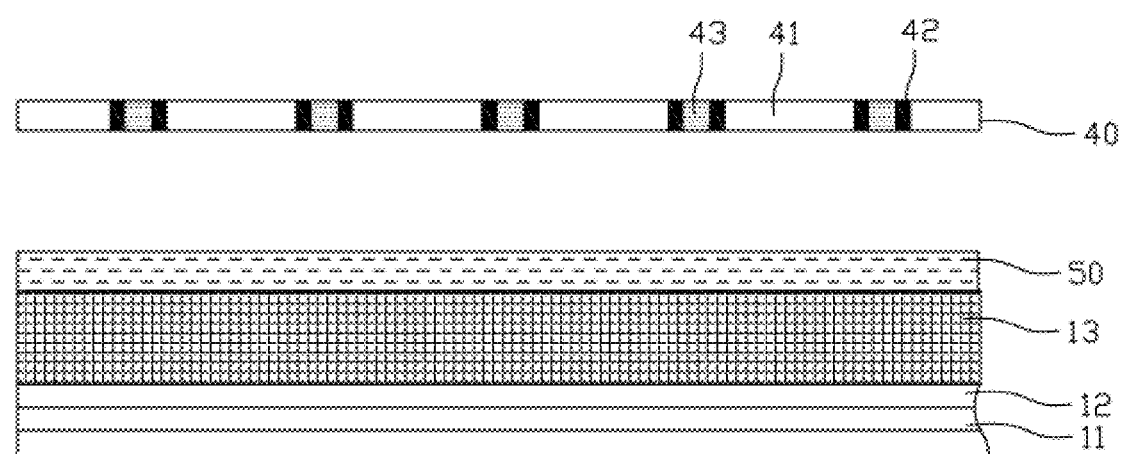
FIG. 3 to FIG. 7 sequentially show schematic structural diagrams of a part of a manufacturing process of S3 of forming an electrophoresis layer in a manufacturing method of a display panel according to Embodiment 1 of the present invention.

The exemplary implementations are described more comprehensively below with reference to the accompanying drawings. However, the exemplary implementations can be implemented in various forms and should not be construed as being limited to examples described herein. On the contrary, these implementations are provided such that the present invention is more comprehensive and complete, and fully conveys the concept of the exemplary implementations to those skilled in the art.

The described features, structures, or characteristics may be incorporated into one or more embodiments in any suitable manner. In the following description, many specific details are provided to give a full understanding of the embodiments of the present invention. However, those skilled in the art will be aware that the technical solutions of the present invention may be practiced with one or more of the specific details omitted, or other methods, components, apparatuses, steps, and the like may be used. In other cases, well-known method, apparatus, implementations, or operations are not shown or described in detail to avoid obscuring aspects of the present invention.

The present invention will be further described below with reference to the accompanying drawings and specific embodiments. It should be noted herein that the technical features involved in various embodiments of the present invention described below can be combined as long as they do not constitute a conflict with each other. The present invention described below with reference to the accompanying drawings are exemplary, and are only used to explain the present invention but should not be construed as a limitation to the present invention.

Embodiment 1

As shown in FIG. 1 to FIG. 14, Embodiment 1 provides a manufacturing method of a display panel. Specifically, the manufacturing method includes:

S1: providing a first substrate 10 shown in FIG. 2.

Optionally, a driving circuit layer 11 is disposed on the first substrate 10, and the driving circuit layer 11 includes at least a plurality of thin-film transistors (not shown in the figure).

S2: forming a planarization layer 12 covering the driving circuit layer 11 on the first substrate 10 shown in FIG. 2, wherein the planarization layer 12 is configured to cover the driving circuit layer 11 and form a flat surface on the first substrate 10, to facilitate manufacturing of subsequent films and play an insulation role.

For example, the planarization layer 12 is made of, for example, perfluoroalkoxy (PFA) plastic (a copolymer of less perfluoropropyl perfluorovinyl ether and polytetrafluoroethylene).

S3: forming an electrophoresis layer 13 on the planarization layer 12 on the first substrate 10 shown in FIG. 3 to FIG. 7.

Optionally, the electrophoresis layer 13 is made of, for example, a polystyrene (PS) plastic layer. The PS plastic is plastic with styrene group in a macromolecular chain, including: styrene and a copolymer thereof. A specific type includes: general purpose polystyrene (GPPS), high impact polystyrene (HIPS), expandable polystyrene (EPS), syndiotactic polystyrene (SPS), and the like.

Further, a plurality of electrophoresis tanks 101 arranged in an array are formed on the electrophoresis layer 13, and positioning blocks 21 are formed between the electrophoresis layer 13 and a second substrate 20.

Further, positioning grooves 102 and the positioning blocks 21 embedded into the positioning grooves 102 are respectively formed on the electrophoresis layer 13 and the second substrate 20. Opening directions of the positioning grooves 102 are the same as opening directions of the electrophoresis tanks 101, and orthographic projections of the positioning groove 102 and the positioning block 21 on the first substrate 10 are at least partially located between orthographic projections of two adjacent electrophoresis tanks 101 on the first substrate 10.

For example, as shown in FIG. 3, the forming a plurality of electrophoresis tanks 101 arranged in an array on the electrophoresis layer 13 and respectively forming positioning grooves 102 and positioning blocks 21 embedded into the positioning grooves 102 on the electrophoresis layer 13 and the second substrate 20 includes: patterning the electrophoresis layer 13 by using a gray tone mask 40, to simultaneously form the electrophoresis tanks 101 and the positioning grooves 102 on the electrophoresis layer 13, and forming the positioning blocks 21 on the second substrate 20.

The gray tone mask 40 includes fully transparent regions 41, opaque regions 42, and semi-transparent regions 43.

It should be understood that when the electrophoresis layer 13 is patterned by using the gray tone mask 40, a first photoresist layer 50 covering the electrophoresis layer 13 is first formed on the first substrate 10, the fully transparent regions 41 are disposed corresponding to the electrophoresis tanks 101, the semi-transparent regions 43 are disposed corresponding to the positioning grooves 102, and the opaque regions 42 are disposed corresponding to other positions than a frame sealant 30. Then, the first photoresist layer 50 covering the electrophoresis layer 13 is exposed and developed, and finally the electrophoresis layer 13 is etched to obtain the electrophoresis layer 13 provided with the electrophoresis tanks 101 and the positioning grooves 102.

Figure 4:
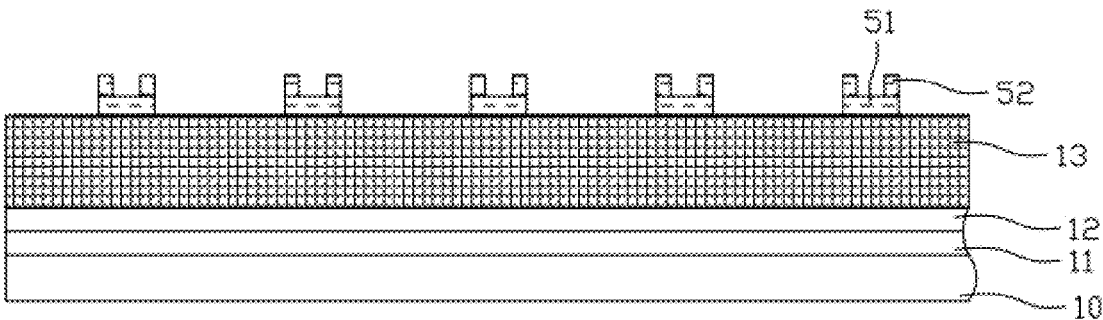

Specifically, as shown in FIG. 4, the developing the first photoresist layer 50 covering the electrophoresis layer 13 includes: completely removing the first photoresist layer 50 corresponding to the fully transparent regions 41, and exposing the corresponding electrophoresis layer 13; removing a part of the first photoresist layer 50 corresponding to the semi-transparent regions 43, and retaining a part of the first photoresist layer 50 to form first photoresist portions 51; and completely retaining the first photoresist layer 50 corresponding to the opaque regions 42, so as to form second photoresist portions 52. A thickness of the second photoresist portion 52 is greater than a thickness of the first photoresist portion 51.

Figure 5:
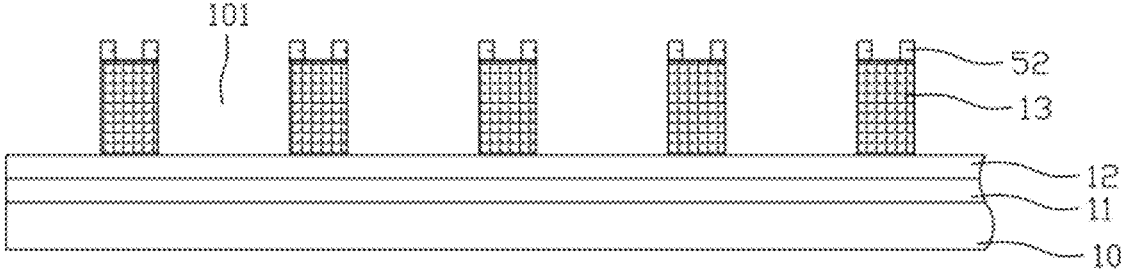

Further, as show in FIG. 5, the electrophoresis layer 13 that does not cover the first photoresist portions 51 and the second photoresist portions 52 is etched, so as to form the electrophoresis tanks 101 on the electrophoresis layer 13.

Figure 6:
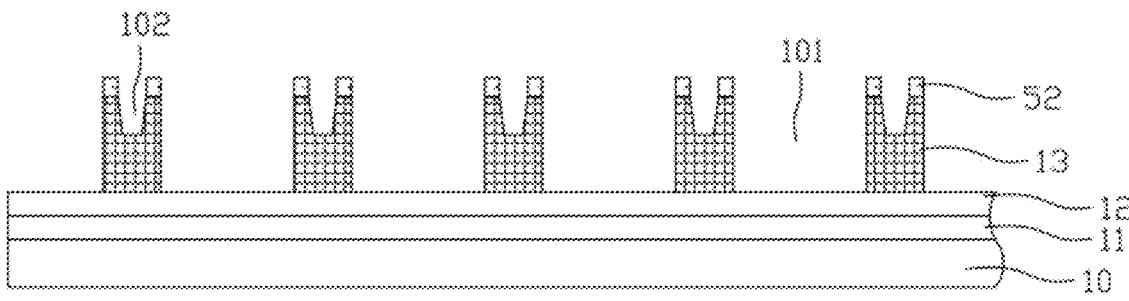

Further, as shown in FIG. 6, ashing and thinning are performed on the first photoresist portions 51 and the second photoresist portions 52, to remove the first photoresist portions 51, and the corresponding electrophoresis layer 13 is exposed, and a part of the second photoresist portions 52 is retained. The exposed electrophoresis layer 13 is etched, so as to form the positioning grooves 102 on the electrophoresis layer 13.

Figure 7:
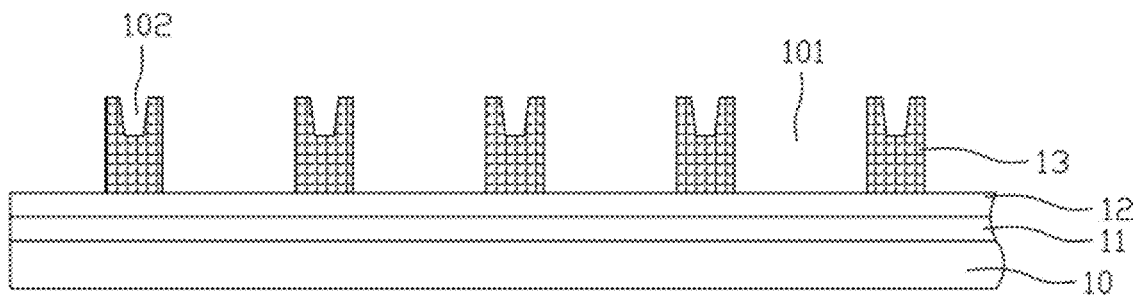

Further, as shown in FIG. 7, the second photoresist portions 52 are removed, to finally obtain the electrophoresis layer 13 provided with the electrophoresis tanks 101 and the positioning grooves 102.

Figure 8:
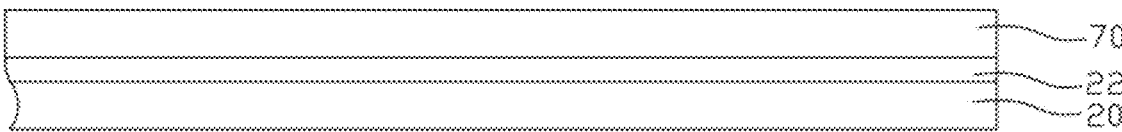
FIG. 8 and FIG. 9 sequentially show schematic structural diagrams of a part of a manufacturing process of S3 of forming positioning blocks in a manufacturing method of a display panel according to Embodiment 1 of the present invention.
Figure 9:
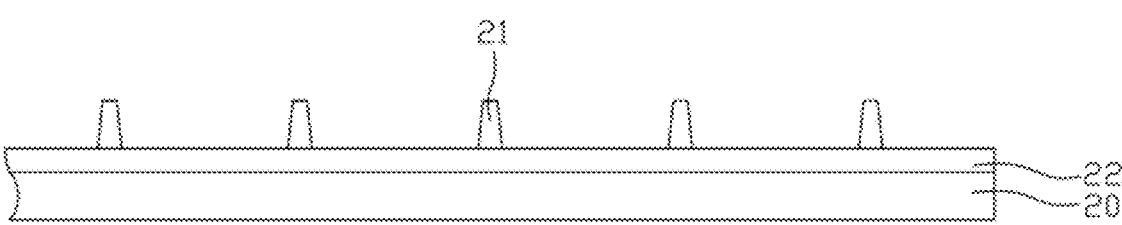

Further, as shown in FIG. 8 and FIG. 9, the positioning blocks 21 embedded into the positioning grooves 102 are formed on the second substrate 20.

For example, the positioning blocks 21 are formed on the second substrate 20. A transparent conductive layer 22 is first formed on the second substrate 20, wherein the transparent conductive layer 22 is formed by, for example, indium tin oxide (ITO); and then a transparent polymer layer 70 is formed on the transparent conductive layer 22, and the transparent polymer layer 70 is etched, so as to form the positioning blocks 21.

The transparent polymer layer 70 is formed by PS plastic. The PS plastic is plastic with styrene group in a macromolecular chain, including: styrene and a copolymer thereof. A specific type includes: GPPS, HIPS, EPS, SPS, and the like.

It should be understood that the positioning grooves 102 and the positioning block 21 are located between the electrophoresis layer 13 and the transparent conductive layer 22.

Figure 10:
FIG. 10 is a schematic structural diagram of a part of a manufacturing process of S3 of forming a sealant layer in a manufacturing method of a display panel according to Embodiment 1 of the present invention.

Further, as shown in FIG. 10, an entire sealant layer 23 is formed on the transparent conductive layer 22, and the sealant layer 23 covers the positioning blocks 21 and is fitted with inner groove walls of the positioning grooves 102. In addition, an orthographic projection of the sealant layer 23 on the first substrate 10 covers orthographic projections of the electrophoresis tanks 101 on the first substrate 10.

It should be understood that the sealant layer 23 is a transparent adhesive.

Figure 11:
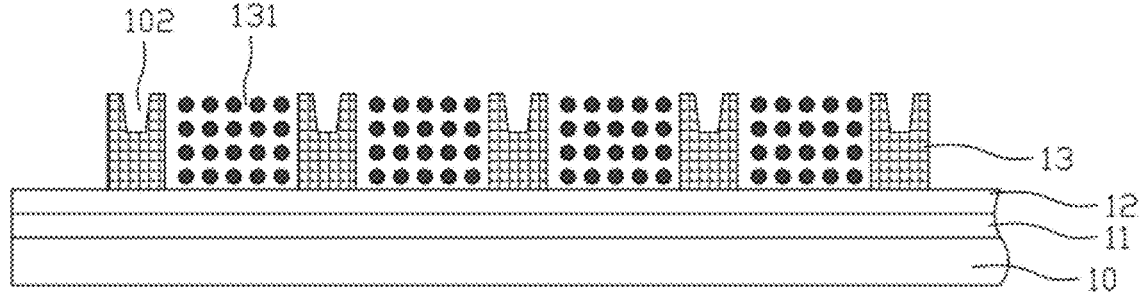
FIG. 11 is a schematic structural diagram of a part of a manufacturing process of S4 in a manufacturing method of a display panel according to Embodiment 1 of the present invention.

S4: forming electrophoresis ions 131 in the electrophoresis tanks 101 shown in FIG. 11.

For example, the electrophoresis ions 131 are coated in the electrophoresis tanks 101 by using an optical distribution frame (ODF) process.

It should be understood that the electrophoresis ions 131 are electrophoresis ink ions.

Figure 12:
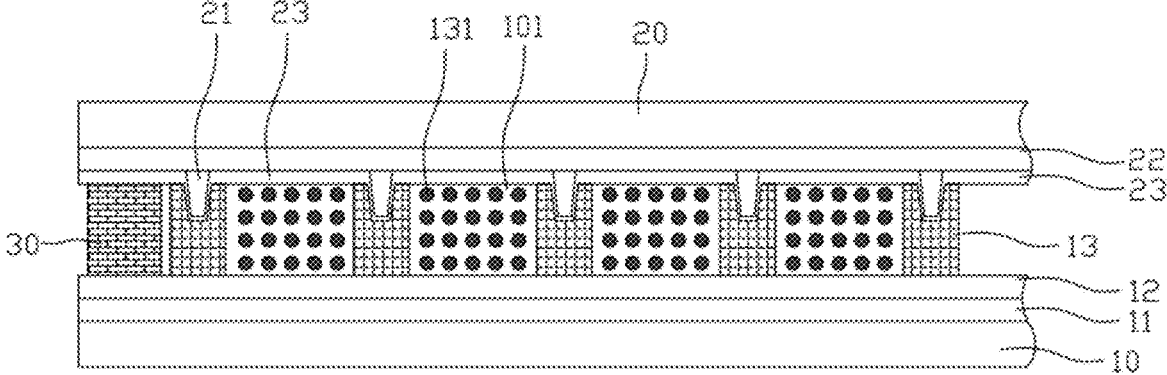
FIG. 12 to FIG. 14 show schematic structural diagrams of a part of a manufacturing process of S5 in a manufacturing method of a display panel according to Embodiment 1 of the present invention.
Figure 13:
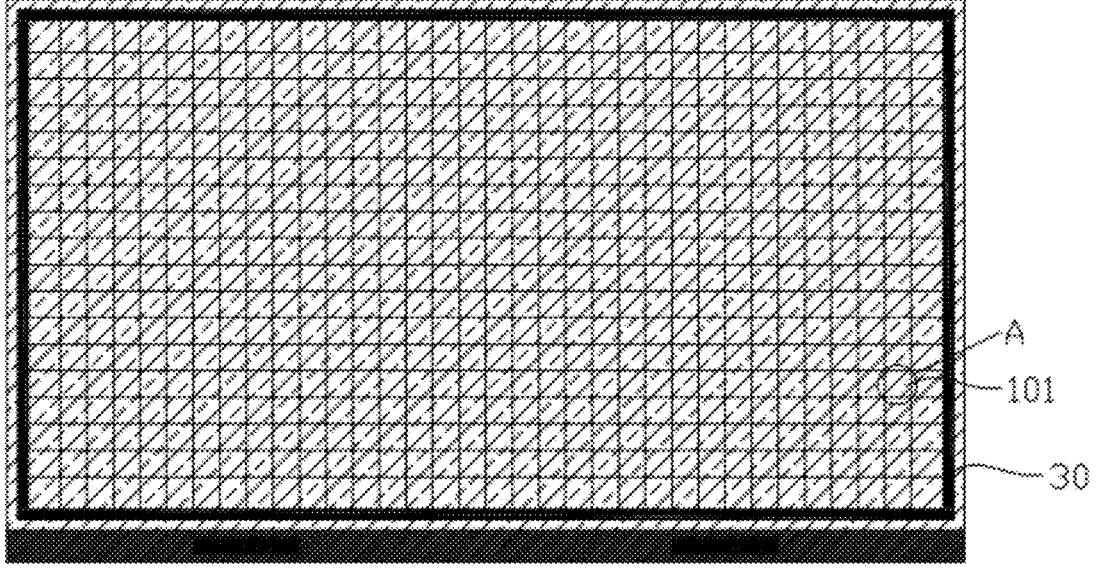
Figure 14:
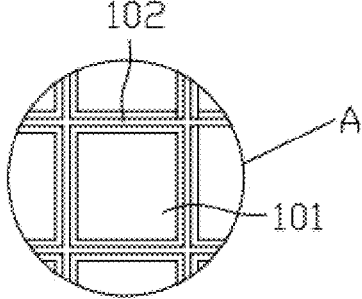

S5: performing cell assembling on the second substrate 20 and the first substrate 10; and simultaneously embedding the positioning blocks 21 into the positioning grooves 102 shown in FIG. 12 to FIG. 14.

As shown in FIG. 13, edges of the second substrate 20 and the first substrate 10 are sealed by using the frame sealant 30.

Based on the foregoing, in the embodiments of the present invention, the electrophoresis tanks 101 and the positioning grooves 102 on the electrophoresis layer 13 are manufactured by using a process of the gray tone mask 40, which reduces the costs compared with a case that the electrophoresis tanks 101 and the positioning grooves 102 on the electrophoresis layer 13 are manufactured by using a conventional mask process. In addition, the electrophoresis layer 13 is subsequently manufactured on the planarization layer 12 provided with the driving circuit layer 11 without additionally disposing an adhesive layer for connecting the electrophoresis layer 13 on the planarization layer 12, to further reduce the costs. In addition, the electrophoresis ink ions are coated by using the ODF process, which breaks through the limitation on a large size during production of the display panel, simplifies the cell assembly manufacturing process, and shortens the process time. The size of a display screen can be flexibly designed, and a super large electrophoretic paper display screen can be made based on the 8.5-generation or more display panel factories, to avoid cutting waste.

Finally, one of the electrophoresis layer 13 and the second substrate 20 is provided with the positioning grooves 102, the other of the electrophoresis layer and the second substrate is provided with the positioning blocks 21 embedded into the positioning grooves 102, and the orthographic projections of the positioning groove 102 and the positioning block 21 on the first substrate 10 are at least partially located between the orthographic projections of two adjacent electrophoresis tanks 101 on the first substrate 10. After the positioning blocks 21 are embedded into the positioning grooves 102, on one hand, the positioning block 21 can form at least a barrier wall located between two adjacent electrophoresis tanks 101 between the electrophoresis layer 13 and the second substrate 20. Therefore, after the electrophoresis ions 131 are subject to external pressure and diffuse outward from the opening of the electrophoresis tank 101 through a gap between the electrophoresis layer 13 and the substrate formed through cell assembling, the positioning block 21 can prevent the electrophoresis ions 131 from diffusing outward, thereby reducing the probability that the electrophoresis ions 131 leave the electrophoresis tank 101. On the other hand, after the positioning block 21 is disposed between the electrophoresis layer 13 and the second substrate 20, and when the electrophoresis layer 13 is subject to a pressing force from the second substrate 20, the positioning block 21 can also play support and pressure resistance roles, thereby improving the pressure resistance of the display panel, reducing the probability that the electrophoresis ions 131 leave the electrophoresis tank 101 from origin, and finally improving a display effect and life of the display panel.

Embodiment 2

As shown in FIG. 15 to FIG. 30, Embodiment 2 provides a manufacturing method of a display panel. The manufacturing method is substantially the same as the method in Embodiment 1, and a difference lies in that steps after S2. Specifically, the manufacturing method includes:

S'1: providing a first substrate 10.

Optionally, a driving circuit layer 11 is disposed on the first substrate 10, and the driving circuit layer 11 includes at least a plurality of thin-film transistors.

S'2: forming a planarization layer 12 covering the driving circuit layer 11 on the first substrate 10, wherein the planarization layer 12 is configured to cover the driving circuit layer 11 and form a flat surface on the first substrate 10, to facilitate manufacturing of subsequent films.

For example, the planarization layer 12 is made of, for example, PFA plastic (a copolymer of less perfluoropropyl perfluorovinyl ether and polytetrafluoroethylene).

S'3: forming an electrophoresis layer 13 on the planarization layer 12 on the first substrate 10 shown in FIG. 15 to FIG. 21. It should be understood that the electrophoresis layer 13 is made of, for example, a PS plastic layer. The PS plastic is plastic with styrene group in a macromolecular chain, including: styrene and a copolymer thereof. A specific type includes: GPPS, HIPS, EPS, SPS, and the like.

Further, a plurality of electrophoresis tanks 101 arranged in an array are formed on the electrophoresis layer 13, and positioning blocks 21 are formed between the electrophoresis layer 13 and a second substrate 20.

Further, positioning grooves 102 and the positioning blocks 21 embedded into the positioning grooves 102 are respectively formed on the electrophoresis layer 13 and the second substrate 20. Opening directions of the positioning grooves 102 are the same as opening directions of the electrophoresis tanks 101, and orthographic projections of the positioning groove 102 and the positioning block 21 on the first substrate 10 are at least partially located between orthographic projections of two adjacent electrophoresis tanks 101 on the first substrate 10.

For example, the forming a plurality of electrophoresis tanks 101 arranged in an array on the electrophoresis layer 13 and respectively forming positioning grooves 102 and positioning blocks 21 embedded into the positioning grooves 102 on the electrophoresis layer 13 and the second substrate 20 includes: patterning the electrophoresis layer 13 by using a first mask 60, so as to form the plurality of electrophoresis tanks 101 on the electrophoresis layer 13.

Specifically, as shown in FIG. 15, the electrophoresis layer 13 is first covered with an entire second photoresist layer 63, wherein the second photoresist layer 63 is a negative photoresist. The second photoresist layer 63 is exposed by using the first mask 60. The first mask 60 includes second opaque regions 61 and second fully transparent regions 62. The second opaque regions 61 are disposed corresponding to positions of the electrophoresis tanks 101 and the frame sealant 30, and the second fully transparent region 62 are disposed corresponding to other positions.

Further, as shown in FIG. 16, the second photoresist layer 63 is developed, the second photoresist layer 63 corresponding to the positions of the electrophoresis tanks 101 and the frame sealant 30 is removed, and the remaining part of the second photoresist layer 63 forms third photoresist portions 631.

Figure 17:
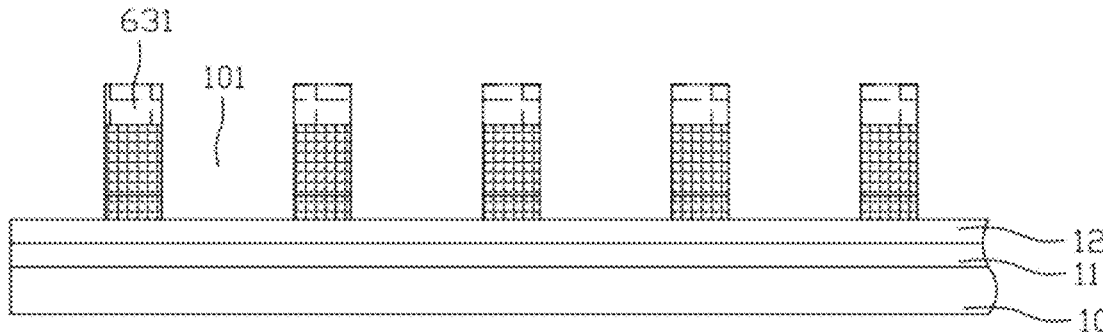

Further, as shown in FIG. 17, the electrophoresis layer 13 that does not cover the third photoresist portions 631 is etched, to remove the electrophoresis layer 13 that does not cover the third photoresist portions 631, so as to form the electrophoresis tanks 101 on the electrophoresis layer 13 and reserve a position for disposing the frame sealant 30.

Further, the third photoresist portions 631 are removed, to expose the electrophoresis layer 13 provided with the electrophoresis tanks 101.

For example, the electrophoresis layer 13 is patterned by using a second mask 64, so as to form the positioning grooves 102 on the electrophoresis layer 13.

Figure 18:
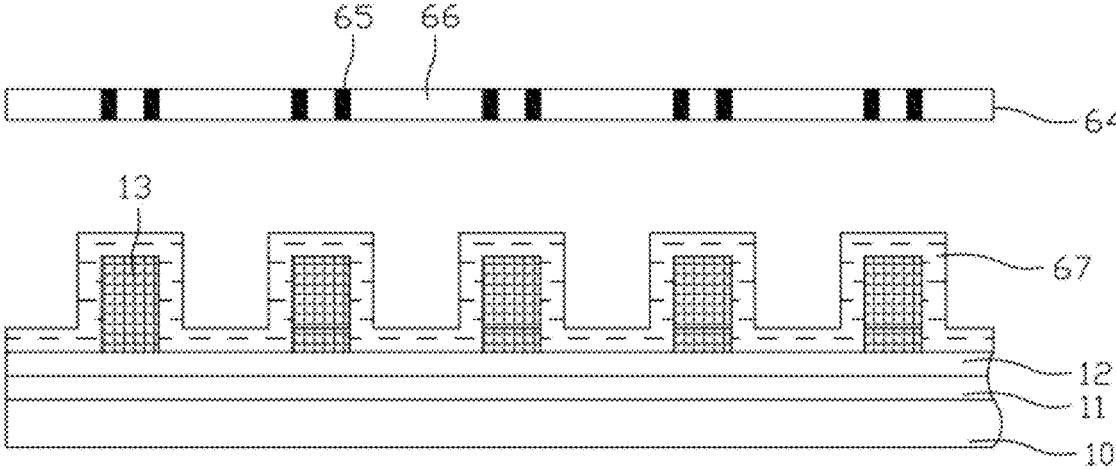

Specifically, as shown in FIG. 18, an entire third photoresist layer 67 covering the electrophoresis layer 13 is first formed on the planarization layer 12, wherein the third photoresist layer 67 is a positive photoresist layer. Then, the third photoresist layer 67 is exposed by using the second mask 64, wherein the second mask 64 includes third fully transparent regions 66 and third opaque regions 65, the third fully transparent regions 66 are disposed corresponding to the positioning grooves 102 and other positions than the electrophoresis layer 13, and the third opaque regions 65 are disposed corresponding to other positions than the third fully transparent regions 66 on the electrophoresis layer 13.

Figure 19:
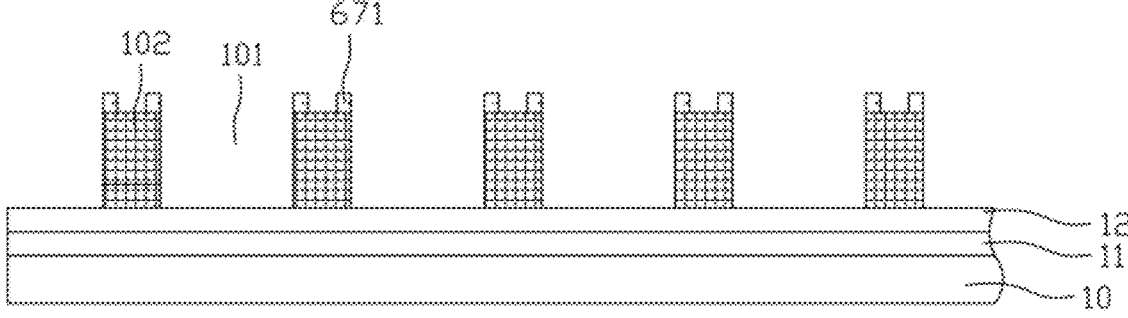

Further, as shown in FIG. 19 and FIG. 20, the third photoresist layer 67 is developed, to remove the third photoresist layer 67 corresponding to the third fully transparent regions 66, the third photoresist layer 67 corresponding to the third opaque regions 65 are reserved, so as to form fourth photoresist portions 671, and a part of the electrophoresis layer 13 is exposed. The exposed electrophoresis layer 13 is etched, so as to form the positioning grooves 102.

Further, as shown in FIG. 21, the fourth photoresist portions 671 are removed, to expose the electrophoresis layer 13 provided with the electrophoresis tanks 101 and the positioning grooves 102.

For example, as shown in FIG. 22 to FIG. 30, the forming the positioning blocks 21 on the second substrate 20 includes: forming an entire transparent polymer layer 70 on the second substrate 20; and patterning on the transparent polymer layer 70 through cooperation of the first mask 60 and the second mask 64, so that the transparent polymer layer 70 forms the positioning blocks 21 embedded into the positioning grooves 102.

It should be understood that the shape of the positioning groove 102 matches the shape of the positioning block 21. Therefore, the second mask 64 for forming the positioning grooves 102 may cooperate with the first mask 60, so as to form the positioning blocks 21, to further save a mask, thereby reducing the costs.

Figure 23:
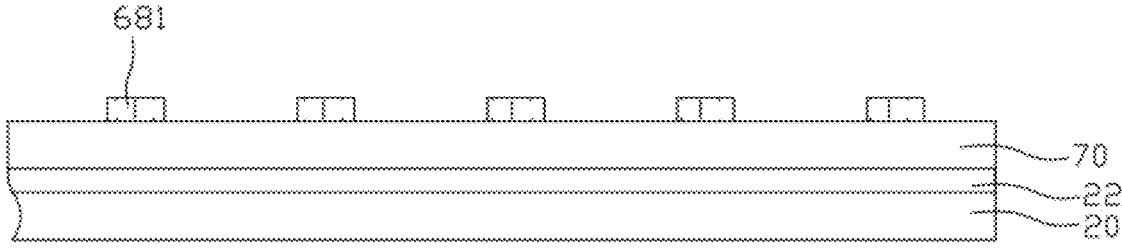
Figure 24:
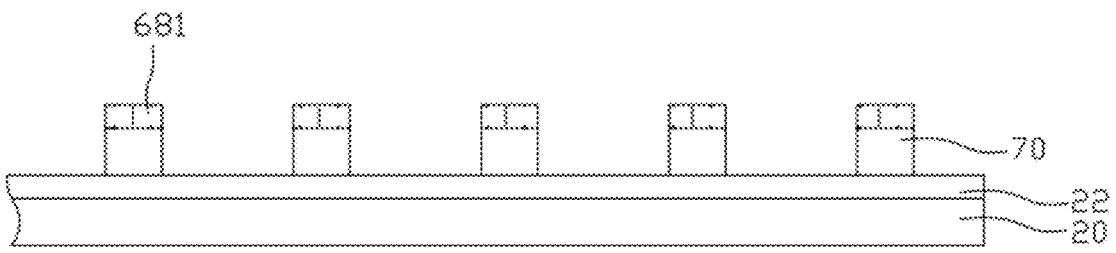

Optionally, as shown in FIG. 22 to FIG. 24, an entire fourth photoresist layer 68 is formed on the transparent polymer layer 70, wherein the fourth photoresist layer 68 is a negative photoresist. The fourth photoresist layer 68 is exposed and developed by using the first mask 60, and the fourth photoresist layer 68 corresponding to the second fully transparent regions 62 is reserved, so as to form fifth photoresist portions 681. In addition, the transparent polymer layer 70 that does not cover the fifth photoresist portions 681 is etched, to remove the transparent polymer layer 70 that does not cover the fifth photoresist portions 681 and reserve the transparent polymer layer 70 covering the fifth photoresist portions 681.

Figure 25:
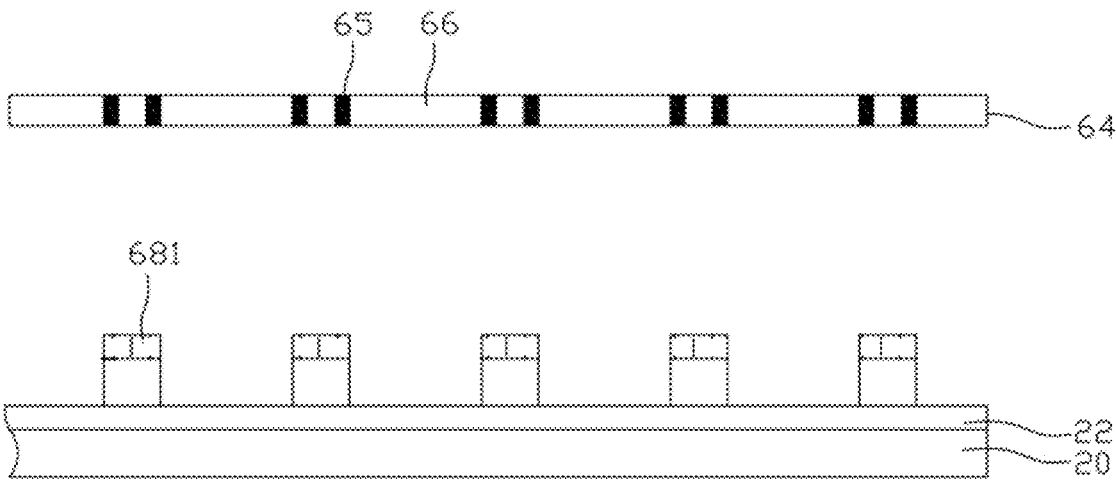

Further, as shown in FIG. 25 to FIG. 27, the fifth photoresist portions 681 are exposed and developed by using the second mask 64, the fifth photoresist portions 681 corresponding to the third opaque regions 65 are removed, and the fifth photoresist portions 681 corresponding to the third fully transparent regions 66 are reserved, so as to form sixth photoresist portions 682. The transparent polymer layer 70 that does not cover the sixth photoresist portions 682 is etched, to remove the transparent polymer layer 70 that does not cover the sixth photoresist portions 682 and reserve the transparent polymer layer 70 covering the sixth photoresist portions 682, and the sixth photoresist portions 682 are removed, to finally form the positioning blocks 21.

Figure 29:
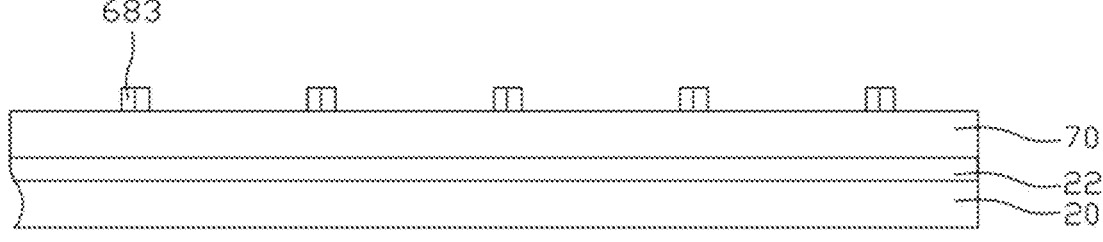
Figure 30:
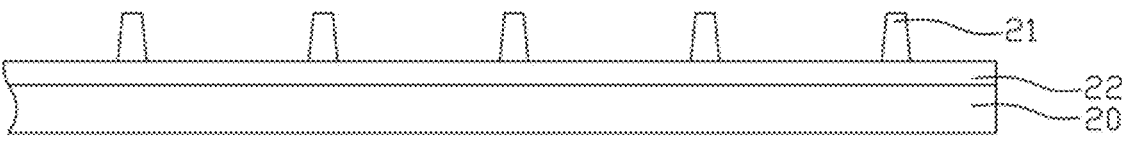

Optionally, as shown in FIG. 28 to FIG. 30, the entire fourth photoresist layer 68 (the fourth photoresist layer 68 is the negative photoresist) is formed on the transparent polymer layer 70. When the fourth photoresist layer 68 is exposed by using the first mask 60, the first mask 60 may further overlap with the second mask 64 to expose the fourth photoresist layer 68. It only needs to be ensured that orthographic projections of the third opaque regions 65 on the second substrate 20 are within orthographic projections of the second fully transparent regions 62 on the second substrate 20, and the orthographic projections of the third opaque regions 65 on the second substrate 20 are in contact with orthographic projections of the second opaque regions 61 on the second substrate 20. That is, after the first mask 60 overlaps with the second mask 64 to expose the fourth photoresist layer 68, a path of light is that the light passes through the first mask 60 through the second fully transparent regions 62, then passes through the third fully transparent regions 66 corresponding to the second fully transparent regions 62 (in this case, because other regions of the third fully transparent region 66 are blocked by the second opaque regions 61, the light cannot pass the other regions), and finally irradiates on the fourth photoresist layer 68.

Further, after the fourth photoresist layer 68 is developed, the fourth photoresist layer 68 corresponding to the second opaque regions 61 is removed, the fourth photoresist layer 68 corresponding to the third opaque regions 65 is removed, and the fourth photoresist layer 68 corresponding to a part of the third fully transparent regions 66 is reserved, so as to form seventh photoresist portions 683. The transparent polymer layer 70 that does not cover the seventh photoresist portions 683 is etched, to remove the transparent polymer layer 70 that does not cover the seventh photoresist portions 683 and reserve the transparent polymer layer 70 covering the seventh photoresist portions 683, and the seventh photoresist portions 683 are removed, to finally form the positioning blocks 21.

S'4: forming electrophoresis ions 131 in the electrophoresis tanks 101.

For example, the electrophoresis ions 131 are coated in the electrophoresis tanks 101 by using an ODF process.

It should be understood that the electrophoresis ions 131 are electrophoresis ink ions.

S'5: performing cell assembling on the second substrate 20 and the first substrate 10; and simultaneously embedding the positioning blocks 21 into the positioning grooves 102.

Edges of the second substrate 20 and the first substrate 10 are sealed by using the frame sealant 30.

Embodiment 3

As shown in FIG. 12 to FIG. 14, Embodiment 1 of the present invention provides a display panel, which is made by using the manufacturing method of a display panel in Embodiment 1 or Embodiment 2.

In some embodiments, the display panel includes a first substrate 10 and a second substrate 20 disposed opposite to the first substrate 10.

Optionally, a driving circuit layer 11 is disposed on the first substrate 10, wherein the driving circuit layer includes at least a plurality of thin-film transistors (TFTs).

Optionally, a planarization layer 12 is further disposed on the first substrate 10, and the planarization layer 12 is configured to cover the driving circuit layer 11 and form a flat surface on the first substrate 10, to facilitate manufacturing of subsequent films. For example, the planarization layer 12 is made of, for example, PFA plastic (a copolymer of less perfluoropropyl perfluorovinyl ether and polytetrafluoroethylene).

Further, an electrophoresis layer 13 and electrophoresis ions 131 are further disposed on the first substrate 10, and the electrophoresis layer 13 is located on the planarization layer 12 and is located between the second substrate 20 and the first substrate 10.

Optionally, the electrophoresis layer 13 is made of, for example, PS plastic. The PS plastic is plastic with styrene group in a macromolecular chain, including: styrene and a copolymer thereof. A specific type includes: GPPS, HIPS, EPS, SPS, and the like.

Optionally, the electrophoresis ions 131 are electrophoresis ink ions.

In some embodiments, the electrophoresis layer 13 is provided with a plurality of electrophoresis tanks 101 arranged in an array, wherein openings of the electrophoresis tanks 101 face the second substrate 20, and the electrophoresis ions 131 are located in the electrophoresis tanks 101.

Optionally, before cell assembling is performed on the first substrate 10 and the second substrate 20, the electrophoresis ink ions are coated in the electrophoresis tanks 101 by using an ODF process. Edges of the first substrate 10 and the second substrate 20 are sealed by using a frame sealant 30, and the electrophoresis ink ions are completely in the electrophoresis tanks 101 through curing.

In some embodiments, positioning blocks 21 are disposed between the electrophoresis layer 13 and the second substrate 20, and an orthographic projection of the positioning block 21 on the first substrate 10 is at least partially located between orthographic projections of two adjacent electrophoresis tanks 101 on the first substrate 10.

It should be understood that after the positioning blocks 21 are disposed between the electrophoresis layer 13 and the second substrate 20, and when the electrophoresis layer 13 is subject to a pressing force from the second substrate, the positioning blocks 21 can play support and pressure resistance roles, to further improve the pressure resistance of the display panel.

Further, one of the electrophoresis layer 13 and the second substrate is provided with positioning grooves 102, and the other of the electrophoresis layer and the second substrate is provided with the positioning blocks 21 embedded into the positioning grooves 102. Orthographic projections of the positioning groove 102 and the positioning block 21 on the first substrate 10 are at least partially located between orthographic projections of two adjacent electrophoresis tanks 101 on the first substrate 10.

For example, a transparent conductive layer 22 is further disposed on the second substrate 20, wherein the transparent conductive layer 22 is formed by, for example, ITO, and the positioning grooves 102 and the positioning blocks 21 are located between the electrophoresis layer 13 and the transparent conductive layer 22.

It should be understood that, one of the electrophoresis layer 13 of the first substrate 10 and the second substrate 20 is provided with the positioning grooves 102, and the other of the electrophoresis layer of the first substrate and the second substrate is provided with the positioning blocks 21 embedded into the positioning grooves 102, which can facilitate accurate cell assembling between the first substrate 10 and the second substrate 20. In addition, after cell assembling is performed on the first substrate 10 and the second substrate 20, the positioning blocks 21 are embedded into the positioning grooves 102, and the connection stability between the first substrate 10 and the second substrate 20 can be improved.

More importantly, one of the electrophoresis layer 13 and the second substrate 20 is provided with the positioning grooves 102, the other of the electrophoresis layer and the second substrate is provided with the positioning blocks 21 embedded into the positioning grooves 102, and the orthographic projections of the positioning groove 102 and the positioning block 21 on the first substrate 10 are at least partially located between the orthographic projections of two adjacent electrophoresis tanks 101 on the first substrate 10. After the positioning blocks 21 are embedded into the positioning grooves 102, on one hand, the positioning block 21 can form at least a barrier wall located between two adjacent electrophoresis tanks 101 between the electrophoresis layer 13 and the second substrate 20. Therefore, after the electrophoresis ions 131 are subject to external pressure and diffuse outward from the opening of the electrophoresis tank 101 through a gap between the electrophoresis layer 13 and the substrate formed through cell assembling, the positioning block 21 can prevent the electrophoresis ions 131 from diffusing outward, thereby reducing the probability that the electrophoresis ions 131 leave the electrophoresis tank 101. On the other hand, after the positioning block 21 is disposed between the electrophoresis layer 13 and the second substrate 20, and when the electrophoresis layer 13 is subject to a pressing force from the second substrate 20, the positioning block 21 can also play support and pressure resistance roles, thereby improving the pressure resistance of the display panel, reducing the probability that the electrophoresis ions 131 leave the electrophoresis tank 101 from origin, and finally improving a display effect and life of the display panel.

In some embodiments, a surface of the electrophoresis layer 13 facing the second substrate 20 is provided with the positioning grooves 102, there are a plurality of positioning grooves 102 arranged in an array, and each of the positioning grooves 102 correspondingly surrounds one electrophoresis tank 101.

For example, the electrophoresis tanks 101 such as square tanks are arranged in an array into a square display region, and the periphery of each electrophoresis tank 101 is provided with a circular square tank which is longer and wider than the electrophoresis tank 101.

Further, the positioning block 21 is protruded on one side of the second substrate 20 facing the electrophoresis layer 13, and there are a plurality of positioning blocks 21 arranged in an array. The positioning blocks 21 are embedded into the positioning grooves 102 in a one-to-one correspondence and each correspondingly surrounds one electrophoresis tank 101.

It should be understood that both the positioning block 21 and the positioning groove 102 are disposed adjacent to the electrophoresis tank 101, and the shape of the positioning block 21 matches the shape of the positioning groove 102. After the positioning block 21 is embedded into the electrophoresis tank 101, a part of the positioning block 21 that is embedded into the electrophoresis layer 13 completely encloses the electrophoresis tank 101, and an orthographic projection of a part of the positioning block 21 located between the electrophoresis layer 13 and the second substrate 20 on the first substrate 10 also completely encloses the electrophoresis tank 101. Therefore, when the electrophoresis ions 131 in the electrophoresis tanks 101 diffuse from the opening to the outside of the tanks, the electrophoresis ions are blocked by the positioning blocks 21, thereby almost preventing the electrophoretic ions 131 in the electrophoresis tanks 101 from leaving the electrophoresis tanks 101.

In some embodiments, the positioning groove 102 has a common groove section, the common groove section is a groove section shared by two adjacent positioning grooves 102, and an orthographic projection of the common groove section on the first substrate 10 is located between two adjacent electrophoresis tanks 101.

Optionally, adjacent electrophoresis tanks 101 are provided around the electrophoresis tank 101 such as the square tank, and a part of the positioning groove 102 exists between every two adjacent electrophoresis tanks 101. Therefore, common groove sections are respectively provided between one electrophoresis tank 101 and other four electrophoresis tanks 101 around the electrophoresis tank, and the positioning groove 102 surrounding the electrophoresis tank 101 may be formed after the common groove sections provided between the electrophoresis tank 101 and the other four electrophoresis tanks 101 around the electrophoresis tank are connected.

It should be understood that in order not to affect the display effect, the distance between two adjacent electrophoresis tanks 101 should not be too large. Therefore, the existence of the common groove section between two adjacent electrophoresis tanks 101 can prevent the repeated disposing of the groove section, and minimize the distance between two adjacent electrophoresis tanks 101, to improve a sampling rate (PPI) of an image.

In some embodiments, a width of a longitudinal section of the positioning block 21 is gradually reduced from one side of the second substrate 20 to one side of the first substrate 10; and/or a width of a longitudinal section of the positioning groove 102 is gradually reduced from one side of the second substrate 20 to one side of the first substrate 10.

For example, the longitudinal section of the positioning block 21 is a trapezoid.

It should be understood that the width of the longitudinal section of the positioning block 21 is gradually reduced from one side of the second substrate 20 to one side of the first substrate 10, and the width of the longitudinal section of the positioning groove 102 is gradually reduced from one side of the second substrate 20 to one side of the first substrate 10. On one hand, this design can play a role of mounting guidance and can facilitate smooth embedding of the positioning block 21 into the positioning groove 102. On the other hand, the damage to the electrophoresis layer 13 caused by the arrangement of the positioning groove 102 is reduced to a certain extent.

In an exemplary embodiment of the present invention, a ratio of a depth of the electrophoresis tank 101 to a depth of the positioning groove 102 ranges from 1 to 6.

A ratio of the depth of the electrophoresis tank 101 to a height of the positioning block 21 ranges from 1 to 6.

For example, the depth of the electrophoresis tank 101 is from 3 um to 6 um. Optionally, the depth of the electrophoresis tank 101 is 3.5 um, 4 um, 4.5 um, 5.0 um, 5.5 um, or 5.8 um. The depth of the positioning groove 102 is from 1 um to 3 um. Optionally, the depth of the positioning groove 102 is 1.2 um, 1.5 um, 2 um, 2.2 um, 2.5 um, or 2.8 um.

For example, the height of the positioning block 21 is from 1 um to 3 um. Optionally, the height of the positioning block 21 is 1.2 um, 1.5 um, 2 um, 2.2 um, 2.5 um, or 2.8 um.

In some embodiments, one side of the second substrate 20 facing the first substrate 10 is further provided with a sealant layer 23. The sealant layer 23 covers the positioning blocks 21, and is fitted with inner groove walls of the positioning grooves 102.

For example, the sealant layer 23 is a transparent adhesive, which enables the positioning blocks 21 to be fixed in the positioning grooves 102 on one hand, and on the other hand, avoids affecting a light output effect of the display panel as much as possible.

It should be understood that a size of the positioning block 21 is slightly smaller than a size of the positioning groove 102, and the smaller part is just a thickness of the sealant layer 23, that is, the sealant layer 23 and the positioning block 21 jointly fill the positioning groove 102, so that the positioning block 21 is more stably connected to the positioning groove 102.

In some embodiments, the sealant layer 23 is fitted with a surface of the electrophoresis layer 13 facing the second substrate 20, and an orthographic projection of the sealant layer 23 on the first substrate 10 covers orthographic projections of the electrophoresis tanks 101 on the first substrate 10.

It should be understood that after cell assembling is performed on the first substrate 10 and the second substrate 20, the sealant layer 23 may seal the openings of the electrophoresis tanks 101, to reduce the probability that the electrophoresis ions 131 leaves the electrophoresis tanks 101.

In addition, the terms such as "first" and "second" are used only for descriptive purposes, and should not be construed as indicating or implying relative importance or implying the number of indicated technical features. Thus, features limited by "first" and "second" may expressly or implicitly include one or more features. In the description of the present invention, "a plurality of" means two or more, unless otherwise specifically defined.

In the present invention, unless otherwise clearly specified, the terms "assembly", "connection", and the like are intended to be understood in a broad sense. For example, the connection may be a fixed connection, removable connection or integral connection; may be a mechanical connection or electrical connection; may be a direct connection or indirect connection using a medium; and may be a communication or interaction between two elements. A person of ordinary skill in the art may understand specific meanings of the foregoing terms in the present invention based on a specific situation.

The solution of the present invention has the following beneficial effects:

In the present invention, one of the electrophoresis layer of the first substrate and the second substrate of the display panel is provided with the positioning grooves, and the other is provided with the positioning blocks embedded into the positioning grooves, which can facilitate accurate cell assembling between the first substrate and the second substrate. In addition, after cell assembling is performed on the first substrate and the second substrate, the positioning blocks are embedded into the positioning grooves, and the connection stability between the first substrate and the second substrate can be improved.

More importantly, one of the electrophoresis layer and the second substrate is provided with the positioning grooves, the other of the electrophoresis layer and the second substrate is provided with the positioning blocks embedded into the positioning grooves, and the orthographic projections of the positioning groove and the positioning block on the first substrate are at least partially located between the orthographic projections of two adjacent electrophoresis tanks on the first substrate. After the positioning blocks are embedded into the positioning grooves, on one hand, the positioning block can form at least a barrier wall located between two adjacent electrophoresis tanks between the electrophoresis layer and the second substrate. Therefore, after the electrophoresis ions are subject to external pressure and diffuse outward from the opening of the electrophoresis tank through a gap between the electrophoresis layer and the substrate formed through cell assembling, the positioning block can prevent the electrophoresis ions from diffusing outward, thereby reducing the probability that the electrophoresis ions leave the electrophoresis tanks. On the other hand, after the positioning block is disposed between the electrophoresis layer and the second substrate, and when the electrophoresis layer is subject to a pressing force from the second substrate, the positioning block can also play support and pressure resistance roles, thereby improving the pressure resistance of the display panel, reducing the probability that the electrophoresis ions leave the electrophoresis tank from origin, and finally improving a display effect and life of the display panel.

In the specification, the description of terms such as "some embodiments", "for example" means that a specific feature, structure, material, or characteristic described in combination with the embodiment(s) or example(s) are included in at least one embodiment or example of the present invention. In this specification, the illustrative expressions of the above terms do not necessarily refer to a same embodiment or example. Furthermore, the specific features, structures, materials, or characteristics described may be combined in a suitable manner in any one or more of embodiments or examples. In addition, those skilled in the art may combine different embodiments or examples described in this specification and characteristics of the different embodiments or examples without mutual contradiction.

Although the embodiments of the present invention have been shown and described above, it can be understood that the above embodiments are exemplary and cannot be understood as limitations on the present invention. A person skilled in the art may change, modify, replace, and modify the above embodiments within the scope of the present invention. Therefore, any change or modification made according to the claims and specifications of the present invention should fall within the scope of the patent of the present invention.

What is claimed is:

1. A display panel comprising: a first substrate and a second substrate disposed opposite to the first substrate, wherein an electrophoresis layer and electrophoresis ions are disposed on the first substrate, the electrophoresis layer is located between the second substrate and the first substrate, the electrophoresis layer is provided with a plurality of electrophoresis tanks arranged in an array, openings of the plurality of electrophoresis tanks face the second substrate, and the electrophoresis ions are located in the plurality of electrophoresis tanks;

wherein one of the electrophoresis layer and the second substrate is provided with a positioning groove, the other of the electrophoresis layer and the second substrate is provided with a positioning block embedded into the positioning groove, and orthographic projections of the positioning groove and the positioning block on the first substrate are at least partially located between orthographic projections of two adjacent electrophoresis tanks on the first substrate;

wherein:

a surface of the electrophoresis layer facing the second substrate is provided with the positioning groove, there are a plurality of positioning grooves arranged in an array, and each of the plurality of positioning grooves correspondingly surrounds one electrophoresis tank; and the positioning block is protruded on one side of the second substrate facing the electrophoresis layer, there are a plurality of positioning blocks arranged in an array, and the plurality of positioning blocks are embedded into the plurality of positioning grooves in a one-to-one correspondence and each correspondingly surrounds one electrophoresis tank;

wherein one side of the second substrate facing the first substrate is further provided with a sealant layer, and the sealant layer is a transparent adhesive; and wherein the sealant layer covers the plurality of positioning blocks and is fitted with inner groove walls of the plurality of positioning grooves.

2. The display panel according to claim 1, wherein the positioning groove has a common groove section, the common groove section is a groove section shared by two adjacent positioning grooves, and an orthographic projection of the common groove section on the first substrate is located between two adjacent electrophoresis tanks.

3. The display panel according to claim 1, wherein a width of a longitudinal section of the positioning block is gradually reduced from one side of the second substrate to one side of the first substrate.

4. The display panel according to claim 1, wherein a width of a longitudinal section of the positioning groove is gradually reduced from one side of the second substrate to one side of the first substrate.

5. The display panel according to claim 1, wherein a width of a longitudinal section of the positioning block is gradually reduced from one side of the second substrate to one side of the first substrate; and a width of a longitudinal section of the positioning groove is gradually reduced from one side of the second substrate to one side of the first substrate.

6. The display panel according to claim 1, wherein a ratio of a depth of the electrophoresis tank to a depth of the positioning groove ranges from 1 to 6.

7. The display panel according to claim 1, wherein the sealant layer is fitted with a surface of the electrophoresis layer facing the second substrate, and an orthographic projection of the sealant layer on the first substrate covers orthographic projections of the plurality of electrophoresis tanks on the first substrate.

* * * * *